United States Patent [19]

Bell et al.

[11] Patent Number: 4,504,130

[45] Date of Patent: Mar. 12, 1985

[54] SYSTEM FOR RECORDING A TIME CODE SIGNAL ON MOTION PICTURE FILM

[75] Inventors: Steven A. Bell, Venice; Ivan T. Kruglak, Sylmar, both of Calif.

[73] Assignee: Coherent Communications, Inc., Sylmar, Calif.

[21] Appl. No.: 424,841

[22] Filed: Sep. 27, 1982

[51] Int. Cl.³ .............................................. G03B 17/24
[52] U.S. Cl. ..................................... 352/92; 352/236; 354/109; 346/108; 346/107 A
[58] Field of Search ...................... 352/92, 84, 236, 12, 352/27; 354/68, 5, 105, 109; 346/107 A, 107 B, 107 C, 107 R, 108; 355/28, 29

[56] References Cited

U.S. PATENT DOCUMENTS

| | | | |
|---|---|---|---|
| 2,937,914 | 5/1960 | Blake | 346/107 |
| 3,439,354 | 4/1969 | Behr et al. | 340/174.1 |
| 3,534,178 | 10/1970 | Weigel et al. | 179/163.2 |
| 3,662,353 | 5/1972 | Chertok | 340/173 R |
| 3,671,112 | 6/1972 | Lennert et al. | 352/84 |
| 3,774,999 | 11/1973 | Ivestor et al. | 352/12 |
| 3,811,768 | 5/1974 | Zahn et al. | 355/29 |
| 3,950,735 | 4/1976 | Patel | 340/172.5 |
| 3,982,032 | 1/1977 | Weinstein | 352/27 X |
| 4,032,224 | 6/1977 | Wray | 352/27 X |
| 4,150,882 | 4/1979 | Konick | 354/105 X |
| 4,168,894 | 9/1979 | Adolph | 352/105 |
| 4,215,920 | 8/1980 | Butler | 352/92 |
| 4,254,371 | 3/1981 | Scholten | 354/5 X |
| 4,295,171 | 10/1981 | Hirota et al. | 360/73 |

Primary Examiner—L. T. Hix
Assistant Examiner—Della J. Rutledge
Attorney, Agent, or Firm—Pretty, Schroeder, Brueggemann & Clark

[57] ABSTRACT

An apparatus and related method for recording a continuous digital time code on motion picture film as it is advanced intermittently by a motion picture camera. The apparatus controllably adjusts the time durations of the successive bits of the signal it records, to compensate for the variable velocity profile of the intermittently advancing film. As a result, the apparatus records the time code signal as a continuous signal with a uniform time base, even though the film is being moved in an intermittent and non-uniform fashion.

31 Claims, 14 Drawing Figures

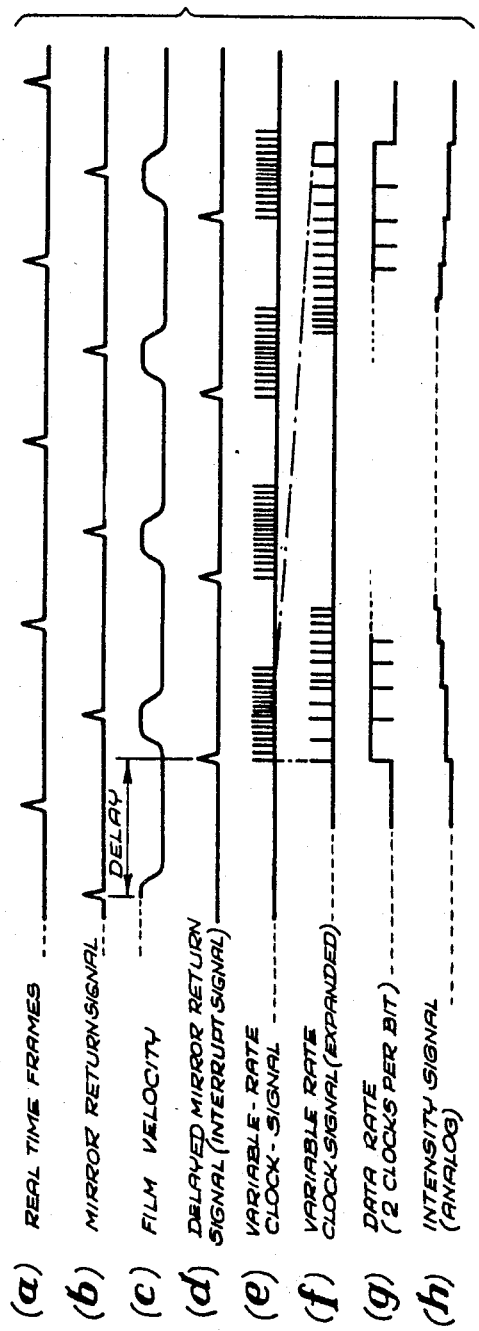
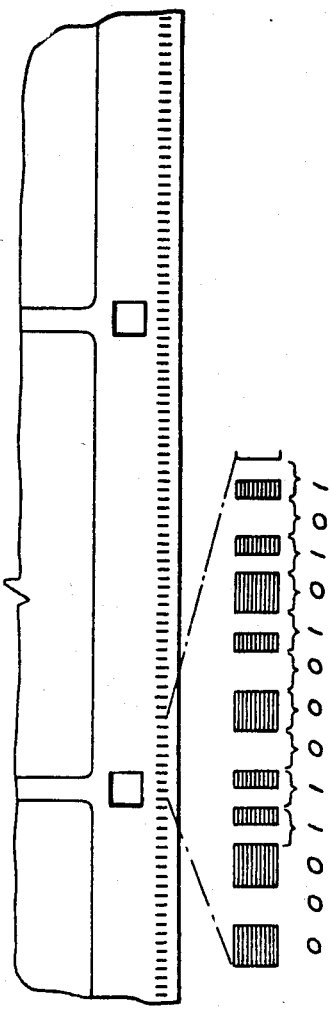

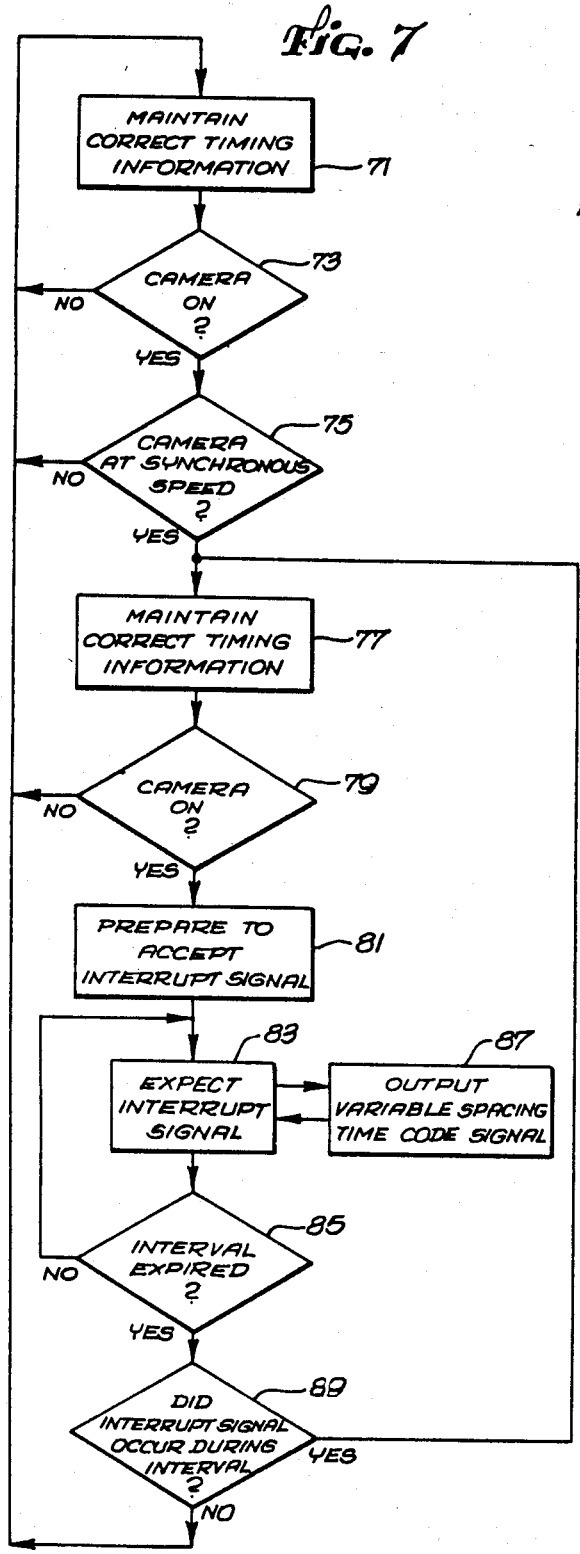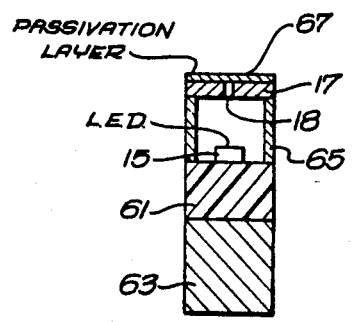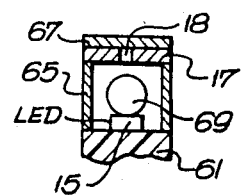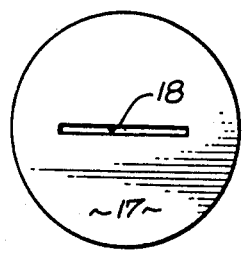

SYSTEM FOR RECORDING A TIME CODE SIGNAL ON MOTION PICTURE FILM

BACKGROUND OF THE INVENTION

This invention relates generally to systems for recording signals on motion picture film, and, more particularly, to systems for recording a continuous time code signal on such film while it is being intermittently advanced by a motion picture camera.

Motion picture film editing normally requires the accurate synchronization of motion picture film with an accompanying sound recording. The film can come from several different cameras operating simultaneously, and the sound recording can include a number of tracks for dialogue, music and appropriate sound effects. It is ordinarily essential that all of the film and sound tracks be arranged in precise synchronization with each other.

Synchronization is relatively easy when editing video tape, as contrasted with motion picture film, because a time code signal can be recorded in a separate time code channel adjacent an edge of the tape. Knowing the exact time at which a particular video frame was recorded makes it relatively easy to synchronize it with other video and audio tapes that record similar time code signals.

Editing motion picture film, on the other hand, has generally been more difficult, because devices have not been available for recording such continuous time code signals on the film. Generally, the film has been synchronized with the various sound tracks by means of a clap stick and its resulting sharp noise. It is believed that one reason such time code signals have not been recorded on motion picture film is because of the anticipated difficulties in recording a continuous signal having a substantially constant bit rate on a medium that moves in an intermittent fashion.

Some prior systems utilized film having a latent digital code signal recorded in a margin of the film prior to its use in a camera. However, since the code was pre-exposed in the film, it could not indicate the actual time at which the corresponding picture frame is exposed.

Another prior system includes a special recording apparatus that records a 12-bit code on the film at the same time it is being intermittently advanced by a camera. The bits are recorded only in the mid-portion of each frame, at a time when the film is being advanced at a substantially constant rate. The system is specifically designed so as not to record near the edges of the frame, when the film is rapidly accelerating or decelerating. The system therefore does not appear to be useful for recording a time code signal that is continuous, without any gaps between its successive bits.

It should therefore be appreciated that there is a need for a system that can record a continuous time code signal on motion picture film, to facilitate a subsequent synchronizing of the exposed film with an associated sound track having the same time code signal recorded on it. The present invention fulfills this need.

SUMMARY OF THE INVENTION

The present invention is embodied in a time code recording apparatus for recording a prescribed time code signal on motion picture film, while a motion picture camera is intermittently advancing the film. The film follows a predetermined velocity profile each time it is advanced by the camera. The apparatus includes transducer means disposed adjacent the film, along with signal generating means for producing the time code signal and coupling it to the transducer means, to record the signal on the film as it is advanced. In accordance with the invention, the apparatus further includes timing means for producing a timing signal indicative of the velocity of the film relative to the transducer means, and the signal generating means includes time base adjustment means, responsive to the timing signal, for adjusting the time base of the time code signal so as to compensate for the film's variable velocity profile. As a result, the time code signal is recorded on the film with a substantially uniform time base, even though the film is advanced in a non-uniform fashion.

More particularly, the time code signal is a digital signal and the apparatus records it in a photosensitive track adjacent one edge of the film. The transducer means preferably includes a light source such as a light-emitting diode (LED) and modulating means for pulsing the LED on and off in a prescribed sequence, to produce a sequence of exposed and unexposed regions on the film. After developing, the time code track becomes a sequence of light and dark regions representative of the time code signal.

The time base adjustment means adjusts the durations of the successive bits such that they are recorded on the film with a substantially constant bit length. The apparatus preferably records the time code signal for substantially the entire duration of each of the intermittent times the camera advances the film past the transducer means, such that the signal appears to be continuous. In another aspect of the invention, the apparatus further includes means for adjusting the intensity of the light produced by the LED in accordance with the film's velocity, such that the successive bits are exposed substantially uniformly despite the film's non-uniform velocity profile.

To synchronize the recording of data with the intermittent advancement of the film, the apparatus utilizes a pulse signal produced by the motion picture camera indicating when the film is stationary. This signal is produced by most conventional cameras, ordinarily for internal use only. The apparatus includes delay means for delaying this pulse signal by a selected amount such that the delayed pulses coincide with the times the film just begins its intermittent advancement. The apparatus commences its recording of data immediately upon receipt of each delayed pulse.

In most conventional motion picture cameras, the instantaneous velocity of the film follows a predetermined profile each time it is advanced by the camera. In the preferred embodiment of the invention, the timing means includes memory means for storing information that characterizes this predetermined velocity profile. The memory means stores a plurality of numbers indicative of the successive time durations required for the camera to advance the film a predetermined distance, preferably the distance corresponding to a recorded bit.

In accordance with another aspect of the invention, the transducer means further includes a mask disposed over the LED, for defining an elongated aperture to transmit a narrow beam of light toward the intermittently advancing film. The mask is positioned such that the film moves over it in a direction substantially perpendicular to the aperture's longitudinal axis. The mask is preferably a thin metal coating on glass, with a glass passivation layer to protect it from wear caused by film abrasion. In an alternative embodiment, a lens can be positioned immediately above the LED, to focus the light onto the mask aperture.

Other aspects and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIGS. 2(a) through 2(h( are a series of timing diagrams useful in explaining the operation of the recording apparatus of FIG. 1;

FIG. 3 is an enlarged fragmentary diagram of the motion picture film having a time code signal recorded on it by the recording apparatus of FIG. 1;

FIG. 4 is a cross-sectitonal view of the LED and associated mask structure of the recording apparatus of FIG. 1;

FIG. 5 is a fragmentary view of an alternative LED structure, this one having a lens for focusing the light beam;

FIG. 6 is a plan view of the mask of FIG. 4, showing its elongated aperture; and FIG. 7 is a simplified flowchart of the process implemented by the microprocessor of FIG. 1;

DESCRIPTION OF THE PREFERRED EMBODIMENT

Figure 1:
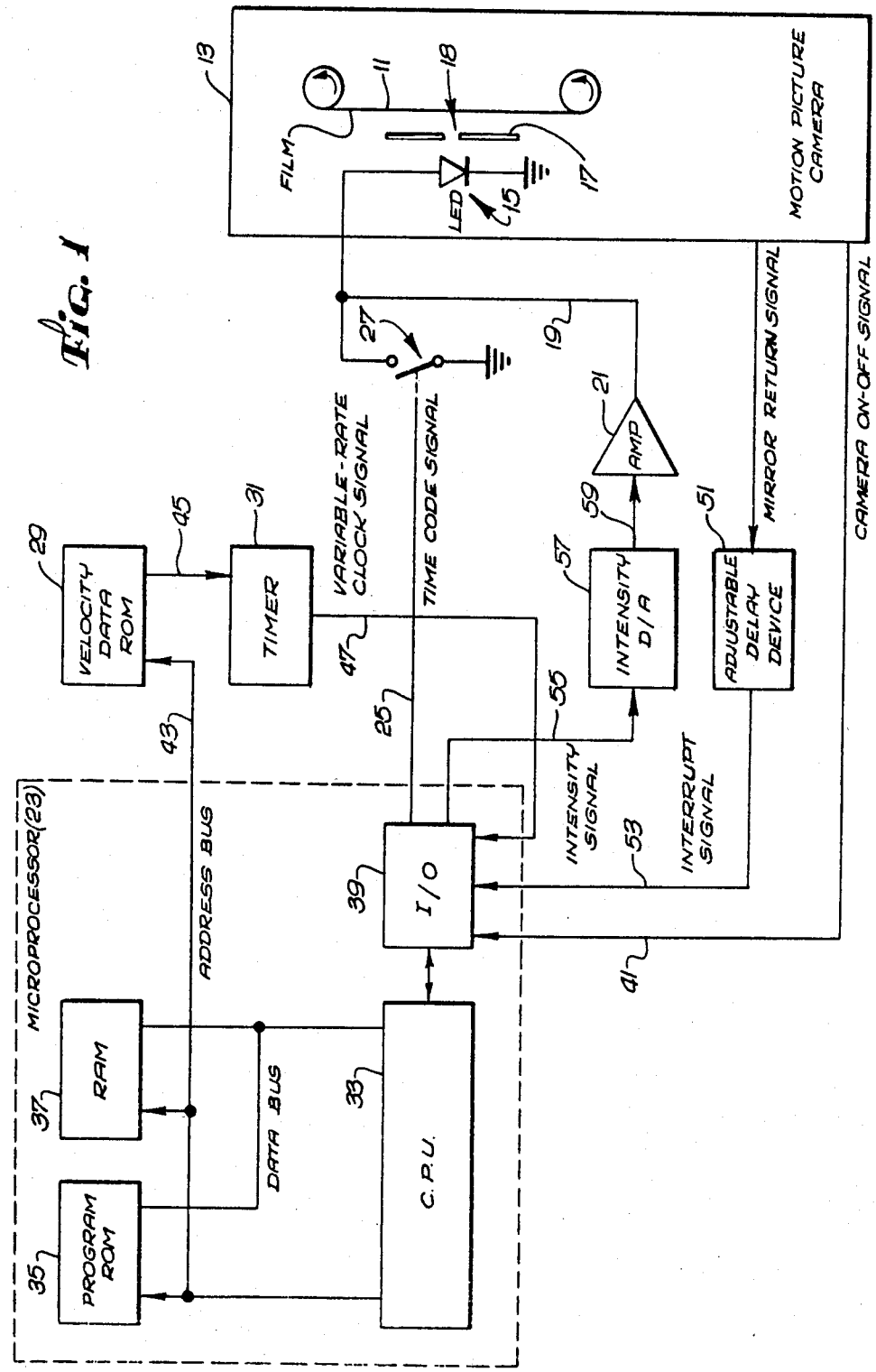
FIG. 1 is a simplified block diagram of time code recording apparatus in accordance with the preferred embodiment of the invention, for recording a digital time code signal on motion picture film.

Referring now to the drawings, and particularly to FIG. 1, there is shown a block diagram of an apparatus for optically recording a digital time code signal on motion picture film 11 as it is being intermittently advanced by a motion picture camera, shown schematically at 13. During the intermittent periods that the film is stationary, the camera's shutter (not shown) is opened to expose a sequence of pictures on the film, whereas during the intermittent periods when the film is being advanced, the apparatus optically records the time code signal along one edge of the film. A fragmentary view of the film after it has been optically recorded with the time code signal is provided in FIG. 3.

The digital time code signal is exposed on the film 11 using a light-emitting diode (LED) 15 and an associated mask 17 having an elongated aperture 18. Electrical current is coupled to the LED on line 19 from an amplifier 19, and a microprocessor 23 outputs a digital time code signal for coupling on line 25 to a switch 27, which either does or does not short the amplifier current to ground. In this fashion, the LED is pulsed on and off in the appropriate manner, to expose a pattern in the film representative of the digital time code signal.

The digital time code signal preferably corresponds to the standard time code format specified by the Society of Motion Picture and Television Engineers (SMPTE). This signal format includes 80 bits of diphase Manchester data for each picture frame, including 64 timing bits and user bits, and 16 synchronizing bits. The timing bits indicate the hour, minute, second and frame number of the current frame, and the user bits indicate whatever information the operator desires. A copending and commonly-assigned application for U.S. patent, filed simultaneously with this application in the name of S. Bell and entitled "Method and Apparatus for Recording a Digital Signal on Motion Picture Film," describes suitable modifications that can be made to the standard SMPTE time code, to facilitate a subsequent detection of the code by conventional SMPTE time code readers.

The instantaneous velocity of the motion picture film 11 relative to the LED 15 and mask 17 follows a predetermined variable velocity profile each time it is advanced one frame spacing by the motion picture camera 13. This velocity profile is generally sinusoidal in shape. A schematic representation of the film's velocity for several successive intermittent advancements is shown in FIG. 2(c).

In accordance with the invention, the microprocessor 23 controllably adjusts the time base of the digital time code signal it outputs on line 25 to pulse on and off the LED 15, so as to compensate for the variable velocity profile of the advancing film 11. This adjusts the lengths of the successively recorded bits to be substantially uniform, notwithstanding of the film's non-uniform velocity.

This variable duration recording is accomplished by the microprocessor 23, a velocity data read-only memory (ROM) 29 and a timer 31. The velocity data ROM stores a plurality of numbers corresponding to the successive time durations required by the camera 13 to advance the film 11 a prescribed distance. In the preferred embodiment, each such number corresponds to the time required to record one half of a bit of the diphase time code signal, which is the minimum time period the LED 15 is in one state or the other, i.e., on or off.

More particularly, the microprocessor 23 includes a CPU 33, a program read-only memory (ROM) 35, a random-access memory (RAM) 37 and an input/output device (I/O) 39. The program ROM stores the program instructions to be implemented by the CPU, the RAM stores the continuously-updated timing information and the user information for inclusion in the time code signal to be recorded, and the I/O appropriately formats the various input and output signals coupled to and from the CPU.

During time periods when the motion picture camera 13 is not turned on, as indicated by an on/off signal it outputs on line 41, the CPU 33 periodically updates the timing information stored in the RAM 37. In particular, it increments the frame number portion of the time code once every 1/24th of a second. This is done even though no actual frames are being exposed by the camera. During periods when the camera is on, on the other hand, the CPU outputs both the time code signal and an address sequence signal. The time code signal is coupled on line 25 to the LED switch 27, and the address sequence signal is coupled on an address bus 43 to the velocity data ROM 29, to appropriately sequence the recording of the digital time code signal on the film 11.

As previously mentioned, the velocity data ROM 29 stores a plurality of numbers indicating the durations of the successive half bit times of the diphase time code signal required to record the signal on the film with a substantially uniform time base. For an 80-bit time code signal, the ROM therefore stores 160 such numbers. The first and last numbers stored represent relatively long durations, since they are addressed when the camera 13 is advancing the film 11 relatively slowly.

When a memory location in the velocity data ROM 29 is first addressed by the address sequence signal, the time duration number it stores is output on lines 45 to the timer 31, for entry into an internal decrementing counter. The timer then begins decrementing the count toward zero at a uniform rate. When the count reaches zero, the timer outputs a clock pulse for coupling on line 47 to the microprocessor 23 and readies itself for acceptance of the next time duration number from the velocity data ROM. Upon receipt of the clock pulse, the microprocessor immediately addresses the next address location in the velocity data ROM, and the cycle is repeated. After the last of the 160 address locations has been selected, the recording process for the current picture frame has been completed, and the microprocessor returns to its mode of continuously updating the timing information being stored in its internal RAM 37.

The 160 time duration numbers stored in the velocity data ROM 29 are initially input into it based on data compiled in prior testing of the motion picture camera 13, or an identical model. It is anticipated that the variable velocity profile represented by this data will not change substantially over the camera's life.

As previously mentioned, when the motion picture camera 13 is not turned on, the microprocessor 23 continuously updates the timing information it stores in its internal RAM 37. This timing information is incremented at frame times of 24 times per second, or at any selected rate for other, non-standard motion picture formats. An internally-used real-time frame signal, indicating the times at which the microprocessor updates the timing information, is depicted in FIG. 2(*a*).

When the motion picture camera 13 is turned on, it outputs the on/off signal for coupling on line 41 to the microprocessor 23, and in addition begins outputting a mirror return signal at regular intervals of time, indicating when the camera's shutter is closed. This signal, which is sometimes called a parking pulse, is ordinarily used by the camera only internally to indicate when the camera should stop advancing the film 11 following disengagement of its shutter release button (not shown). In the apparatus of FIG. 1, however, this mirror return signal is coupled on line 49 to an adjustable delay device 51 for delaying the successive pulses by a selected amount such that each delayed pulse coincides with the start of film advance. The delayed mirror return signal, which is depicted in FIG. 2(*e*), is coupled on line 53 to the microprocessor, to indicate each time the microprocessor should initiate its addressing of the velocity data ROM 29 and thereby initiate recording of the time code signal on the film.

The apparatus delays recording the time code signal on the film 11 until the motion picture camera 13 has reached a stable speed. This ordinarily requires only a few frames. The microprocessor 23 determines when the camera is up to speed by comparing the delayed mirror return signal (FIG. 2(*d*)) supplied to it on line 53 with its internal real-time frame signal (FIG. 2(*a*)). In particular, the period between two successive pulses of the internal real time frame signal is divided into a number of time segments, e.g., 160. Once two consecutive delayed mirror return pulses occur during the same time segment number of successive frames, the microprocessor determines that the camera is up to speed.

After the motion picture camera 13 is determined to be up to speed, the CPU 33 awaits input of a pulse in the delayed mirror return signal (FIG. 2(*d*)). As soon as a pulse is detected, the CPU addresses the first of the 160 address locations in the velocity data ROM 29 and simultaneously outputs the first half bit of the time code signal, for coupling on line 25 to the LED switch 27. As previously mentioned, the velocity data ROM outputs an appropriate number to the timer 31, which begins decrementing the number to zero. Once the timer reaches zero, it outputs a clock pulse for coupling on line 47 to the microprocessor, which responds by addressing the next memory location in the velocity data ROM and by outputting the next appropriate half bit of the time code signal. This process is repeated until all 160 half bits have been recorded.

The successive bursts of 160 clock pulses from the timer 47 for several consecutive picture frames are depicted in FIG. 2(*e*). FIG. 2(*f*) depicts the same signal on an expanded scale. It should be observed that the successive pulses are relatively far apart from each other at the beginning and end of the burst, when the film 11 is moving relatively slowly and a longer time duration is required to record a bit of constant length. The 80 bits of the diphase time code signal recorded as a result of the successive clock pulses of FIG. 2(*f*) are shown in FIG. 2(*g*).

In another aspect of the present invention, the apparatus controllably varies the intensity of the beam of light produced by the LED 15 in accordance with the film's instantaneous velocity, so that all 80 bits of the diphase time code signal are exposed in the film 11 by substantially the same degree. Reducing the intensity of the light beam at the beginning and end of each 80 bit time code word, reduces the likelihood of exposing portions of the film beyond the extent of the mask aperture 18.

To accomplish this, the microprocessor 23 outputs an appropriate sequence of digital words for coupling on lines 55 to an intensity digital-to-analog converter (D/A) 57, which converts each word to a corresponding analog voltage signal for coupling on line 59 to the amplifier 21. The amplifier, in turn, generates a corresponding current for coupling to the LED on line 19. This current, which is of course representative of the LED's intensity, is depicted in FIG. 2(*h*). It is selected to equal one of several discrete levels, e.g. 8, each time of the film moves in its intermittent fashion. The digital word for each such intensity level is stored in the microprocessor's internal program ROM 35.

FIG. 4 is a cross-sectional view of the LED 15, the mask 17 and their associated structure. The LED is disposed on a substrate that includes an insulator 61 and a metal case 63 carrying a positive potential. The mask is supported above the LED on a metal case 65 carrying a negative potential. A glass passivation layer 67 is coated on the mask's exposed surface, to reduce wear on the mask caused by film abrasion. In an alternative embodiment, a fragmentary view of which is shown in FIG. 5, the structure further includes a cylindrical lens 69 cemented directly on top of the LED's light-emitting surface. It focuses the light on the mask aperture 18, to increase the system's efficiency.

A plan view of the exposed surface of the mask 17 is shown in FIG. 6. The elongated aperture 18 preferably has a width of about 0.2 mils, and a length of 10 mils when used to record on 16 mm film and 20 mils when used to record on 35 mm film. In use, the mask is positioned immediately adjacent to the motion picture film 11 such that the film slides across the glass passivation layer 67. This reduces the likelihood that light passing through the aperture will diffuse outwardly and insures that the edge of the successive bits are sharply defined. The structure is oriented such that the film is moved in a direction substantially perpendicular to the aperture's longitudinal axis.

With reference now to FIG. 7 there is shown a simplified flowchart of the steps performed by the microprocessor 23 in controlling the time code recording apparatus' operating sequence. In an intial step 71, which is ordinarily performed only when the motion picture camera 13 is off, the microprocessor updates the time code signal being stored in its internal RAM 37. It then determines whether or not the camera is on, at step 73. If the camera is not on, the program returns to the initial step of updating the time code. If the camera is on, on the other hand, the microprocessor determines at step 75 whether or not the camera has reached synchronous speed. If it has not, the program returns to the initial step 71 of updating the time code.

Once it is determined at step 75 that the camera has reached synchronous speed, the microprocessor 23 maintains the correct time code signal stored in its internal RAM 37, at step 77, and determines whether or not the camera 13 is still on, at step 79. If it is not still on, the program returns to the initial step 71 of updating the time code.

On the other hand, if it is determined at step 79 that the camera 13 is still turned on, the microprocessor 23 prepares to accept a delayed mirror return signal, i.e., an interrupt signal, at step 81. In particular, it performs a number of other, conventional steps while waiting for a narrow window or interval in which the next interrupt pulse is expected to occur. This interval is preferably about 2 bit times in duration. When the interval begins, the microprocessor expects an interrupt pulse to occur, at step 83, and determines whether the interval has expired, at step 85. The microprocessor repeats steps 83 and 85 until it determines that the interval has expired. If an interrupt pulse occurs at any time during the interval, the microprocessor shifts to a special interrupt loop 87 in which it sequentially addresses the 160 address locations in the velocity data ROM 29, while outputting 160 one-half bits of time code data. After this interrupt loop is completed, the microprocessor returns to the point it was at when the interrupt pulse occurred.

Eventually, either after the interrupt loop designated by step 87 is completed or after the interval has expired without the occurrence of an interrupt pulse, it will be determined at step 85 that the interval has expired. The microprocessor 23 then determines at step 89 whether or not an interrupt pulse occurred during the interval. If it did, the program returns to the step 77 of updating the correct timing information in the internal RAM 37. On the other hand, if it's determined that an interrupt pulse did not occur during the interval, the program returns to the initial step 71 of updating the interval RAM.

It should be appreciated from the foregoing description that the present invention provides an improved apparatus for recording a digital time code signal on motion picture film while it is being intermittently advanced by a camera. The apparatus controllably adjusts the time duration of its recording of each of the successive bits of the time code signal, to compensate for the film's variable velocity profile. As a result, a continuous digital time code signal having a uniform time base is recorded on the film, even though the film is being moved in an intermittent and nonuniform fashion.

Although the invention has been described in detail with reference to the presently preferred embodiment, it should be understood by those of ordinary skill in the art that various modifications can be made without departing from the invention. Accordingly, the invention is limited only by the following claims.

We claim:

1. Apparatus for recording a time code signal on film while it is being intermittently advanced by a motion picture camera, each intermittent film advancement following a variable velocity profile, the apparatus comprising:
   transducer means disposed adjacent the film;
   signal generating means for coupling a time code signal to the transducer means, to record the signal on the film as the motion picture camera advances the film past the transducer means; and
   timing means for producing a timing signal indicative of the instantaneous velocity of the film relative to the transducer means, as the film is advanced intermittently past the transducer means;
   wherein the signal generating means includes time base adjustment means, responsive to the timing signal, for adjusting the time base of the time code signal coupled to the transducer means, to compensate for the variable velocity profile of the film such that the time code signal is recorded on the film with a substantially constant time base.

2. Apparatus as defined in claim 1, wherein:
   the film includes a photosensitive region adjacent one of its edges; and
   the transducer means includes a light source and means for modulating the intensity of the light produced by the light source, to expose the time code signal in the photosensitive region of the film as it is being intermittently advanced by the camera.

3. Apparatus as defined in claim 2, wherein:
   the time code signal is a digital signal; and
   the means for modulating modulates the light source on and off in accordance with the time code signal.

4. Apparatus as defined in claim 2, and further including means for adjusting the intensity of the light produced by the light source in accordance with the instantaneous velocity of the film relative to the transducer means.

5. Apparatus as defined in claim 2, wherein the light source includes:
   semiconductor means having a light-emitting surface;
   mask means, disposed over the semiconductor means, for defining an elongated aperture to transmit a narrow beam of light, the aperture having a width substantially smaller than the light-emitting surface of the semiconductor means; and
   means for positioning the mask means adjacent the motion picture film, such that the motion picture camera advances the film in a direction substantially perpendicular to the longitudinal axis of the elongated aperture.

6. Apparatus as defined in claim 1, wherein:
   the time code signal is a digital signal; and
   the time base adjustment means adjusts the durations of the successive digital bits of the time code signal coupled to the transducer means, such that the transducer means records the signal on the film with substantially constant bit lengths.

7. Apparatus as defined in claim 1, wherein the signal generating means couples the time code signal to the transducer means for the entire duration of each of the intermittent times the camera moves the film past the transducer means, such that the transducer means records the time code signal on the film as a continuous signal.

8. Apparatus as defined in claim 7, wherein:
the motion picture camera generates a pulse signal indicating when the film is stationary; and
the apparatus further includes delay means for delaying the pulse signal by a prescribed amount, to indicate when the signal generating means coupling should first couple the time code signal to the transducer means.

9. Apparatus as defined in claim 1, wherein:
the instantaneous velocity of the film follows a predetermined profile each time it is advanced by the camera; and
the timing means includes memory means for storing information that characterizes the predetermined velocity profile.

10. Apparatus as defined in claim 9, wherein the memory means stores a plurality of numbers indicating the successive time durations required for the camera to advance the film a predetermined distance.

11. Apparatus as defined in claim 9, wherein:
the time code signal is a digital signal; and
the successive time durations indicated by the plurality of number stored in the memory means correspond to the durations of the successive bits of the time code signal coupled to the transducer means.

12. Apparatus for recording a continuous digital time code signal on motion picture film while it is being intermittently advanced by a motion picture camera, each intermittent film advancement advancing the film a distance of one frame and following a predetermined velocity profile, the apparatus comprising:
transducer means disposed adjacent the film;
signal generating means for coupling a prescribed digital time code signal to the transducer means for the duration of each of the intermittent time periods the camera advances the film past the transducer means, to record the time code signal on the film as a continuous signal; and
timing means for producing a timing signal indicative of the instantaneous velocity of the film relative to the transducer means, as the film is moved intermittently past the transducer means;
wherein the signal generating means includes time base adjustment means for adjusting the durations of the successive digital bits coupled to the transducer means in accordance with the timing signal, to compensate for the variable velocity profile of the film such that the transducer means records the time code signal on the film with substantially constant bit lengths.

13. Apparatus as defined in claim 12, wherein:
the film includes a photosensitive region adjacent one of its edges; and
the transducer means includes a light source and means for modulating the light source on and off in accordance with the time code signal, to expose the time code signal in the photosensitive region of the film as it is being advanced intermittently by the camera.

14. Apparatus as defined in claim 13, and further including means for adjusting the intensity of the light produced by the light source in accordance with the instantaneous velocity of the film relative to the light source.

15. Apparatus as defined in claim 13, wherein the light source includes:
semiconductor means having a light-emitting surface;
mask means, disposed over the semiconductor means, for defining an elongated aperture to transmit a narrow beam of light, the aperture having a width substantially smaller than the light-emitting surface of the semiconductor means; and
means for positioning the mask means adjacent the motion picture film, such that the motion picture camera advances the film in a direction substantially perpendicular to the longitudinal axis of the elongated aperture.

16. Apparatus as defined in claim 12, wherein:
the motion picture camera generates a pulse signal indicating when the film is stationary; and
the apparatus further includes delay means for delaying the pulse signal by a prescribed amount, to indicate when the signal generating means should first couple the time code signal to the transducer means.

17. Apparatus as defined in claim 12, wherein the timing means includes memory means for storing a plurality of numbers indicating the successive time durations required by the camera to advance the film a predetermined distance.

18. Apparatus for recording a continuous digital time code signal on motion picture film while it is being intermittently advanced by a motion picture camera, each intermittent film advancement advancing the film a distance of one frame and following a predetermined velocity profile, the film including a photosensitive region adjacent one of its edges; the apparatus comprising:
a light source disposed adjacent the photosensitive region of the film;
modulating means for modulating the light source on and off;
signal generating means for coupling a prescribed digital time code signal to the modulating means for the duration of each of the intermittent time periods the camera advances the film past the light source, to expose the time code signal in the film as a continuous signal;
timing means for producing a sequence of clock pulses indicative of the successive timing durations required by the camera to advance the film a predetermined distance; and
means for adjusting the intensity of the light produced by the light source in accordance with the instantaneous velocity of the film relative to the light source;
wherein the signal generating means includes time base adjustment means for adjusting the durations of the successive digital bits coupled to the transducer means in accordance with the sequence of clock pulses to compensate for the variable velocity profile of the film such that the transducer means records time code signal on the film substantially constant bit lengths.

19. A method for recording a time code signal on film while it is being intermittently advanced by a motion picture camera, each intermittent film advancement following a variable velocity profile, the method comprising steps of:
positioning a transducer means adjacent the film;
coupling a time code signal to the transducer means to record the signal on the film as the motion picture camera advances the film past the transducer means; and producing a timing signal indicative of the instantaneous velocity of the film relative to the transducer means, as the film is moved intermittently past the transducer means;

wherein the step of coupling includes a step of adjusting the time base of the time code signal coupled to the transducer means, in accordance with the timing signal, to compensate for the variable velocity profile of the film such that the time code signal is recorded on the film with a substantially constant time base.

20. A method as defined in claim 19, wherein:

the film includes a photosensitive region adjacent one of its edges; and the transducer means includes a light source; and the method further includes a step of modulating the intensity of the light produced by the light source, to expose the time code signal in the photosensitive region of the film as it is being intermittently advanced by the camera.

21. A method as defined in claim 20, wherein:

the time code signal is a digital signal; and the step of modulating modulates the light souce on and off in accordance with the time code signal.

22. A method as defined in claim 20, and further including a step of adjusting the intensity of the light produced by the light source in accordance with the instantaneous velocity of the film relative to the transducer means.

23. A method as defined in claim 19, wherein:

the time code signal is a digital signal; and the step of adjusting the time base adjusts the durations of the successive digital bits of the time code signal coupled to the transducer means, such that the transducer means records the signal on the film with substantially constant bit lengths.

24. A method as defined in claim 19, wherein the step of coupling couples the time code signal to the transducer means for the entire duration of each of the intermittent time periods the camera advances the film past the transducer means, such that the transducer means records the time code signal on the film as a continuous signal.

25. A method as defined in claim 24, wherein:

the motion picture camera generates a pulse signal indicating when the film is stationary; and the method further includes a step of delaying the pulse signal by a prescribed amount, to indicate when the time code signal should first be coupled to the transducer means in the step of coupling.

26. A method as defined in claim 19, wherein:

the instantaneous velocity of the film follows a predetermined profile each time it is moved by the camera; and the step of producing a timing signal includes a step of extracting from memory means information that characterizes the predetermined velocity profile.

27. A method for recording a continuous digital time code signal on motion picture film while it is being intermittently advanced by a moetion picture camera, each intermittent film advancement advancing the film a distance of one frame and following a predetermined velocity profile, the method comprising steps of:

positioning a transducer means adjacent the film;

coupling a prescribed digital time code signal to the transducer means for the duration of each of the intermittent time periods the camera advances the film past the transducer means, to record the time code signal on the film as a continuous signal; and producing a timing signal indicative of the instantaneous velocity of the film relative to the transducer means, as the film is moved intermittently past the transducer means;

wherein the step of coupling includes a step of adjusting the durations of the successive digital bits coupled to the transducer means, to compensate for the variable velocity profile of the film such that the transducer means records time code signal on the film with substantially constant bit lengths.

28. A method as defined in claim 27, wherein:

the film includes a photosensitive region adjacent one of its edges; and the transducer means includes a light source; and the method further includes a step of modulating the light source on and off in accordance with the time code signal, to expose the time code signal in the photosensitive region of the film as it is being advanced intermittently by the camera.

29. A method as defined in claim 28, and further including a step of adjusting the intensity of the light produced by the light source in accordance with the instantaneous velocity of the film relative to the light source.

30. A method as defined in claim 27, wherein:

the motion picture camera generates a pulse signal indicating when the film is stationary; and the method further includes a step of delaying the pulse signal by a prescribed amount, to indicate when the time code signal should first be coupled to the transducer means in the step of coupling.

31. A method as defined in claim 27, wherein the step of producing a timing signal includes a step of extracting from memory means a plurality of numbers indicating the successive time durations required by the camera to advance the film a predetermined distance.

* * * * *